(12) United States Patent
Zilber et al.

(10) Patent No.: US 11,934,547 B2
(45) Date of Patent: Mar. 19, 2024

(54) MULTIPROTOCOL ACCESS CONTROL

(71) Applicant: VAST DATA LTD., Tel Aviv (IL)

(72) Inventors: Erez Zilber, Tel Aviv (IL); Eli Dorfman, Tel Aviv (IL); Gili Berg, Tel Aviv (IL); Nir Brifman, Tel Aviv (IL); Guy Keren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 471 days.

(21) Appl. No.: 17/301,373

(22) Filed: Mar. 31, 2021

(65) Prior Publication Data

US 2022/0318414 A1 Oct. 6, 2022

(51) Int. Cl.
*G06F 21/62* (2013.01)
*G06F 16/245* (2019.01)

(52) U.S. Cl.
CPC ........ *G06F 21/6218* (2013.01); *G06F 16/245* (2019.01)

(58) Field of Classification Search
CPC ............................ G06F 21/6218; G06F 16/245
See application file for complete search history.

(56) References Cited

U.S. PATENT DOCUMENTS

| | | | | |
|---|---|---|---|---|
| 2001/0039622 A1* | 11/2001 | Hitz | ........................ | G06F 21/41 707/999.009 |
| 2015/0135331 A1* | 5/2015 | Das | ..................... | G06F 21/6218 726/27 |

\* cited by examiner

*Primary Examiner* — Brian F Shaw
(74) *Attorney, Agent, or Firm* — Reches Patents (57) ABSTRACT

A method for access control, the method may include (a) receiving, by a file server, an access request for allowing a user to access a file system entity, the user is identified by a first file system protocol (FSP) user identifier, (b) converting the first FSP user identifier to a first access control user identifier (ACUI) of the user, the first ACUI represents a combination of the user and the first FSP, (c) searching, within an access control data structure (ACUI), for a relevant access control rule associated with a member of a multiprotocol set of ACUIs of the user, wherein the multiprotocol set includes the first ACUI of the user and at least one other ACUI of the user that represents at least one combination of the user and at least one other FSP, and (d) responding to the access request based on the relevant access control rule, when finding the relevant access control.

17 Claims, 5 Drawing Sheets

MULTIPROTOCOL ACCESS CONTROL

TECHNICAL FIELD

The present disclosure generally relates to the field of access control.

BACKGROUND

Filesystems utilize access control lists (ACLs) for assigning permissions to users accessing files and directories. ACLs ensures that only authorized users get access to directories and files. Each ACL has an owner that is associated with it, who owns the file or directory for which the ACL is defined. Owners usually have full access to the files or directories that they own. Other users or groups may be defined in the ACL with permissions for reading, writing, executing, etc.

User identifiers are used for identifying users in the ACLs. Various schemes are used for identifying user, for example: UID (User ID) identifiers used by UNIX-like operating systems and filesystems (NFS) for identifying users, GID (Group ID) identifiers used by UNIX-like operating systems and filesystems for identifying groups of users, SID (Security ID) identifiers used by Windows operating systems and related filesystems (SMB) for identifying users and groups.

There is a need to handle access permissions and user identifiers, in an efficient manner, in multiprotocol file servers.

SUMMARY

There may be provide a file server, a method and a non-transitory computer readable medium for access control.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a file server, a method and a non-transitory computer readable medium for access control.

A storage system may provide file server services or exhibit file server capabilities in the sense that it may act as one or more file servers.

The system and method of the present invention manage user identifiers used by multiple file protocols for identifying and authenticating users.

Information that correlates different user identifiers, used by different protocols, to the same user, are gathered from multiple authentication resources: authentication providers as well as from an internal authentication management.

Identifier mapping is provided, and includes: (i) one-to-one translation from various protocol user identifiers to internal user identifiers (also referred to as access control user identifiers), and vice versa; and (ii) a mapping from each of the internal user identifiers to a set of matching internal user identifiers that belongs to the same user, where various internal user identifiers of the set may correspond to different protocol user identifiers.

The internal user identifiers may be non-protocol compliant and are internally used by the storage system, as they can use a compact memory footprint. For example, if the system supports up to 1M different user identifiers, than the size of a variable storing an internal identifier may be a size that support storing the values 0 to 1M (e.g., 4 bytes are more than enough). Unlike the compact memory footprint of an internal user identifier, protocol user identifiers may utilize quite long memory presentations, for example, SID is a variable length string of up to 256 characters.

The access rights are stored in the ACLs by using internal user identifiers that correspond to protocol user identifiers that were used by the protocol that was employed by the client for creating the corresponding files, for creating the ACL, or updating the ACL.

The identifiers mapping provides a two-stage mapping that facilitates updates being made by various authentication providers without needing to change identifiers associated with files.

Figure 1:
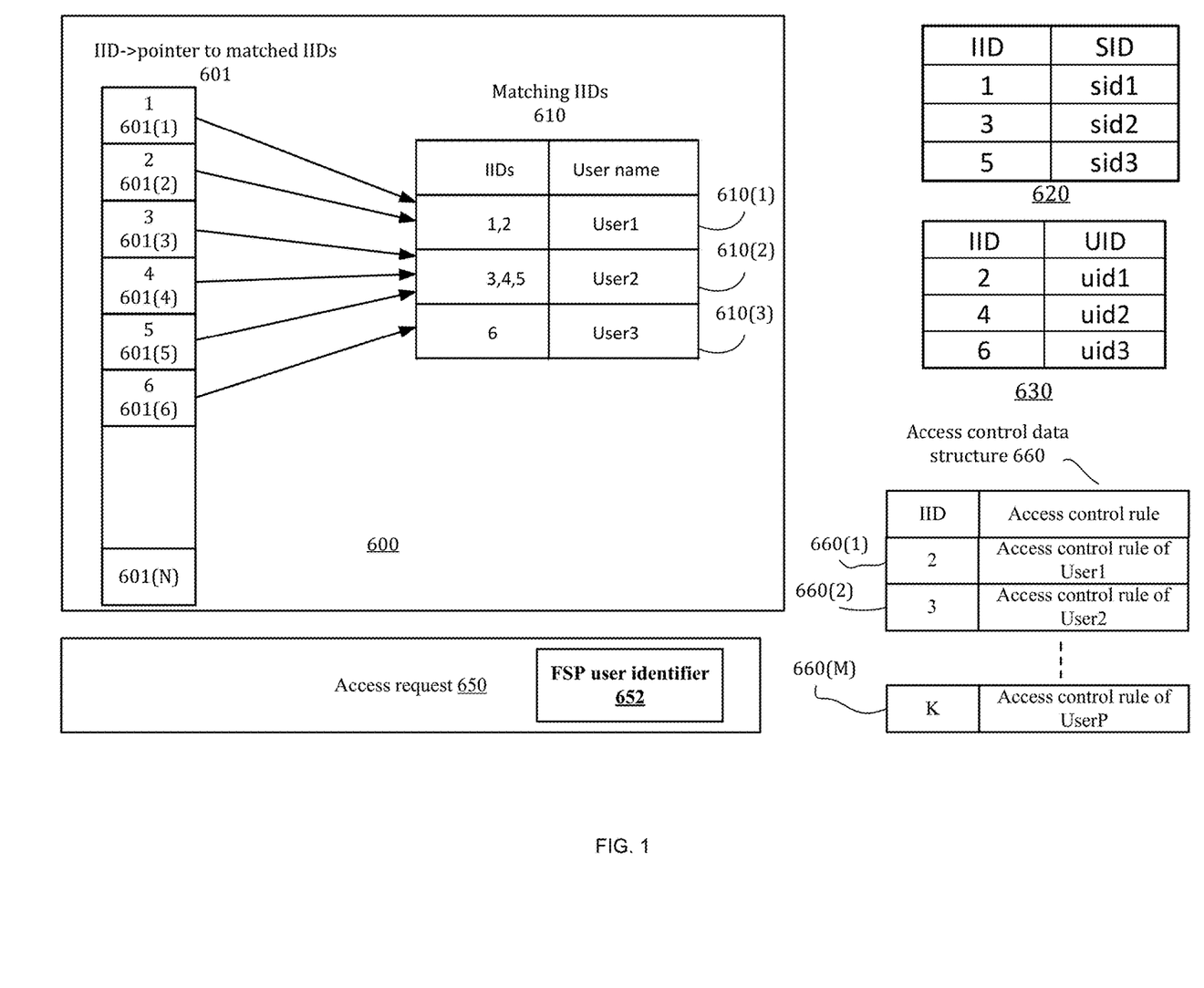
FIG. 1 illustrates an example of data structures.

FIG. 1 illustrates the identifiers mapping that is composed of matching user identifiers data structure 600, and one or more identifier translation tables, such as identifier translation tables 620 and 630, an access request 650 and an access control data structure 160.

Identifier translation tables, e.g., 620 and 630 translate internal identifiers (also referred to as access control identifiers) to/from file protocol identifiers, also referred to as file system protocol (FSP) user identifiers. Identifier translation table 620 is used for translating SIDs (originating from SMB protocol) to/from internal identifiers, and translation table 630 for translating UIDs (originating from NFS protocol) to/from internal identifiers. Other identifier translation tables may be used for translating from other protocol identifiers to and from internal identifiers, or from group identifiers (e.g., GID, SID groups) into internal identifiers. Other embodiments may use the same identifier translation table for all the identifier formats.

Identifier translation table 620 translates internal identifiers (IIDs) to SIDs, and vice versa. For example, the iid=1 is associated with a SID named sid1, iid=3 is associated with sid2, iid=5 is associated with sid3.

Identifier translation table 630 translates internal identifiers (IIDs) to UIDs, and vice versa. For example, the iid=2 is associated with a UID named uid1, iid=4 is associated with uid2, iid=6 is associated with uid3.

Similar translations may be implemented for groups, i.e., for translating GID and SID belonging to groups into internal group identifiers.

A matching internal identifiers mapping 600 maps each internal identifier (IID) to matching internal identifiers that are associated with the same user. Matching internal identifiers mapping 600 includes matching identifier (iid) pointers 601, that includes entries 601(1)-601(N) for each internal identifier, where N is the number of different internal user identifiers supported by the system. Each entry points to an entry in matching identifiers (iids) table 610 that corresponds to a specific internal user identifier, as illustrated by the arrows.

In the illustrated example, a user named "User1" is associated with two identifiers: sid1—when accessing via SMB, that is mapped into an internal identifier iid=1, and uid1-when accessing from NFS, that is mapped into an internal identifier iid=2.

Matching internal identifiers table 610 associates iids with values 1 and 2 as matching internal identifiers, belonging to the same user, named "User1". Entry 601(1) of matching identifier pointers 601 corresponds to iid having the value '1', and points to entry 610(1) in the matching internal identifiers table 610. Entry 610(1) includes information for this specific user, including: the user name, in this case "User1", and all the iids of this user. In this case, User1 is associated with 2 iids numbered 1 and 2. Referring to mapping tables 620 and 630, iids having the values '1' and '2' are associated with SID=sid1 and UID=uid1. Matching internal identifiers table 610 is also referred to as "multi-protocol set of access control user identifiers"

Entry 601(2) of matching identifier pointers 601 points to the same entry 610(1) of matching internal identifiers table 610, since iid=2 is also associated with User1.

As for another example, a user named "User2" is associated with uid2 when accessing via NFS, which is mapped to iid=4, and is also associated with sid2 that is mapped to iid=3. At some point the system administrator may change the Active Directory service to another Active Directory, and assign new SIDs to users, where user "User2" is now associated with sid3, which is being mapped to iid=5. However, "User2" may still be associated with sid2, also referred to as "historical sid", at least for the duration of the migration to the new Active Directory service. Therefore, matching internal identifiers entry 610(2) includes iids 3, 4 and 5. Entries 601(3), 601(4) and 601(5) of matching identifier pointers 601—all points to the same matching internal identifiers entry 610(2).

The user named "User3" is only associated with uid3, which is mapped to iid=6. Entry 601(6) that corresponds to iid6 points only to matching internal identifiers entry 610(3).

When a file is created, or an ACL is created or updated by a client using a first file protocol, e.g., NFS, an ACL is established for storing the access rights for the client and optionally for other users. The user identifiers are indicated by the first file protocol as first protocol user IDs, i.e., UID or GID format when using NFS. The first protocol user IDs are translated into internal identifiers, and written to the ACL using the internal format.

The same file can be subsequently accessed, e.g., for read, write or other operation, by a user, that accesses the file as a client of either the first protocol or as a client of a second protocol, e.g., SMB (identified by a SID, e.g., sid1).

Suppose the accessing user is a SMB client, having a second protocol user ID, e.g., sid1. The second protocol user ID is translated into an internal identifier, e.g., iid2, which may be different from any internal identifier listed in the ACL, since the original identifiers were mapped into internal identifiers that are mapped from the first protocol identifiers.

In this case, a matching user identifier is looked up. In order to check whether a client identified as sid1 is authorized to access the file, the sid1 is translated into an internal identifier, e.g., iid2, for looking up the matching internal identifiers mapping 600.

An entry in matching identifier pointers 601 that is associated with internal identifier iid2 is looked for the pointer to an entry in the matching internal identifiers table 610, e.g., entry 610(1).

The internal identifiers documented in entry 610(1) are the accessing user internal identifiers, these identifiers are checked against the internal identifiers listed in the entries of the ACL. If an ACL entry contains one of the accessing user internal identifiers, then the accessing user can be granted with the access mode (e.g., read only, read/write, execute) indicated in the ACL entry.

In this specific example, entry 610(1) indicates that both iid=1 an iid=2 belong to the same user that created the file, and therefore the SMB user is authorized to access the file in any manner that an owner can access the file.

Upon a change in a protocol user identifier, by a system administrator or upon receiving updates from authentication services, such as Active Directory or LDAP, a new entry with the new protocol identifier is added to one of the identifier translation tables 620 or 630, and a new internal identifier is assigned for the new protocol identifier. The user's entry in the matching internal identifiers table 610 is also updated so as to add the internal user identifier, or to replace an existing internal user identifier with the new internal identifier. No change is made to ACLs.

Suppose a system administrator changed an SMB protocol identifier of the above user from sid1 to sid4. A new entry will be added for sid4 in table 620 for mapping sid4 to a newly assigned internal identifier, e.g., iid=7. The matching identifiers of the user will now associate internal identifiers 7 and 2, instead the previous matching of 1 and 2. If the user will access the file, when identified as user uid1 (iid=2), which is the identifier written in the ACL, the access will be granted. The access will be granted also when the user will be identified as user sid4 (whose internal identifier iid=7 is matched to iid=2). The access will be denied if the user accesses with the previous SMB identifier sid1, since it is no longer appear in the matching identifiers of that user.

The access request 650 is formatted according to a certain file system protocol (FSP) and includes an FSP user identifier 652.

The access control data structure 660 of a certain filesystem entity (e.g., a file, a directory, an object) includes a plurality (for example M) of entries 660(1)-660(M) for storing access control rules for P users userl-userP. It should be noted that M may equal P, may exceed P or may be lower then P. Each of the M entries includes an IID field for storing one or more IIDs (for example 2, 3 and K), and also includes an access control rule associated with the one or more IIDs. According to embodiments of the invention, only one IID is stored per each user, so as to save storage space, where the stored IID is mapped to the FSP ID used for creating or updating the access control data structure. According to other embodiments, there may be cases where the one or more IIDs of a single field are one or more members of multiprotocol set of access control user identifiers of a certain user. The access control data structure 660 may be an ACL of the file being addressed by access request 650.

Figure 2A:
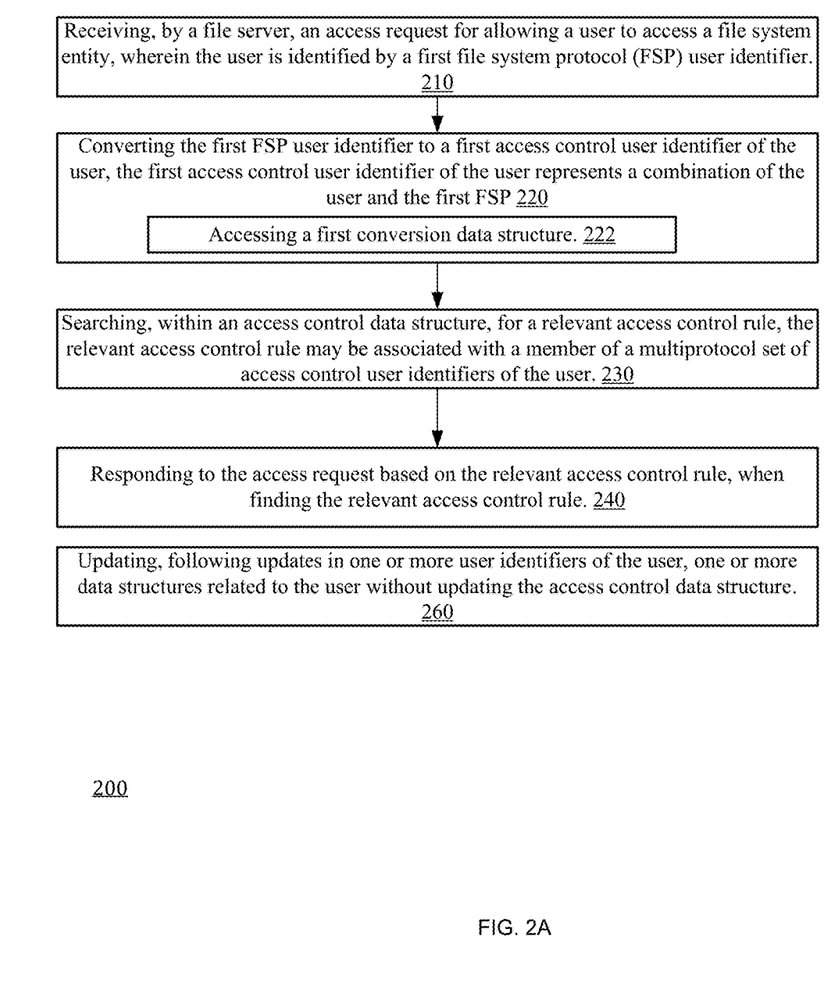
FIG. 2A illustrates an example of a method.

FIG. 2A illustrates a method 200 for access control.

Method 200 may start by step 210 of receiving, by a file server, an access request for allowing a user to access a file system entity, wherein the user may be identified by a first file system protocol (FSP) user identifier.

A file system entity may be, for example, a file, a directory, or an object of an object store.

Step 210 may be followed by step 220 of converting the first FSP user identifier to a first access control user identifier of the user, the first access control user identifier of the user represents a combination of the user and the first FSP. For example, IID=1 of FIG. 1 represents the user named "User1" when using SMB protocol. The size of the first FSP user identifier exceeds (for example by a factor of at least 3, 5, 10, 15, 20, and the like) a size of the first access control user identifier of the user.

The term "first" is merely used to distinguish the FSP of the access request from another FSP that may be used for subsequently accessing the filesystem entity, and to distinguish the first access control user identifier from other access control user identifiers of the user—or of other users.

Examples of first access control user identifiers of users are the IIDs of FIG. 1.

Step 220 may include step 222 of accessing a first conversion data structure.

There may be provided a conversion data structure per each FSP, and a user may be identified in one or more of the conversion data structure. Identifier translation tables 620 and 630 of FIG. 1 are examples of conversion data structure per two FSPs.

Step 220 may be followed by step 230 of searching, within an access control data structure of the file system entity, for a relevant access control rule, the relevant access control rule may be associated with a member of a multiprotocol set of access control user identifiers of the user. The member may be the first access control user identifier of the user, but may be a different member that is not the first access control user identifier.

The multiprotocol set of access control user identifiers of the user may include the first access control user identifier of the user and at least one other access control user identifier of the user that represents at least one combination of the user and at least one other FSP.

FIG. 1 provides an example of an access control data structure 660 of the filesystem entity related to access request 650. Access control data structure 660 may have more than one entry, such as entries 660(1)-660(K), where each entry includes one IID (one member of a multiprotocol set of access control user identifiers). Examples of multiprotocol sets of access control user identifiers are illustrated in matching IIDs 610 of FIG. 1—within the left column titled "IIDs". For example—the multiprotocol set of access control user identifiers of User1 includes IIDs 1 and 2. The multiprotocol set of access control user identifiers of User2 includes IIDs 3, 4 and 5. The multiprotocol set of access control user identifiers of User3 includes IID 6.

Step 230 may be followed by step 240 of responding to the access request based on the relevant access control rule, when finding the relevant access control rule.

Step 240 may include denying the access request or accepting the access request.

Step 240 may include denying the access request when failing to find the multiprotocol set of access control user identifiers of the user.

For example—referring to FIG. 1—the access control data structure 660 does not include IID=6 of user3—and thus User3 will not be granted access.

Step 240 may include denying the access when none of the members of the multiprotocol set of access control user identifiers, that is associated with the first access control user identifier, is included in access control data structure 660. For example, when sid1 is changed to sid7, and the access control user identifier that was associated with sid1 was removed from the multiprotocol set, where sid1 is indicated in a rule of access control data structure 660, then—the access is denied.

Step 240 may include granting the access request, when finding the relevant access control rule. The granting is made according to the relevant access control rule (according to the access rights—for example—read only, read and write, and the like). The relevant access control rule includes one of the members of the multiprotocol set of access control user identifiers, that is associated with the first access control user identifier.

Step 240 may include granting the access request even when the member of the multiprotocol set of access control user identifiers (stored in the access control data structure) differs from the first access control user identifier.

For example—referring to FIG. 1—assuming that the first access control user identifier of userl is IID=1. In the access control data structure 660 the multiprotocol set of access control user identifiers of User1 is represented by IID=2. Nevertheless—an access request that will include uid1 (associated with IID=2) will cause a search of either one of IID=1 and IID=2 (both belonging to multiprotocol set of access control user identifiers of User1) in the access control data structure 660—and because the access control data structure 660 includes an access control rule for User1 (associated with IID=1)—then the access control rule for User1 is deemed to be the relevant access control rule—and it is enforced.

Step 240 may include granting the access request even when the first access controller identifier is not stored in the access control data structure.

Figure 2B:
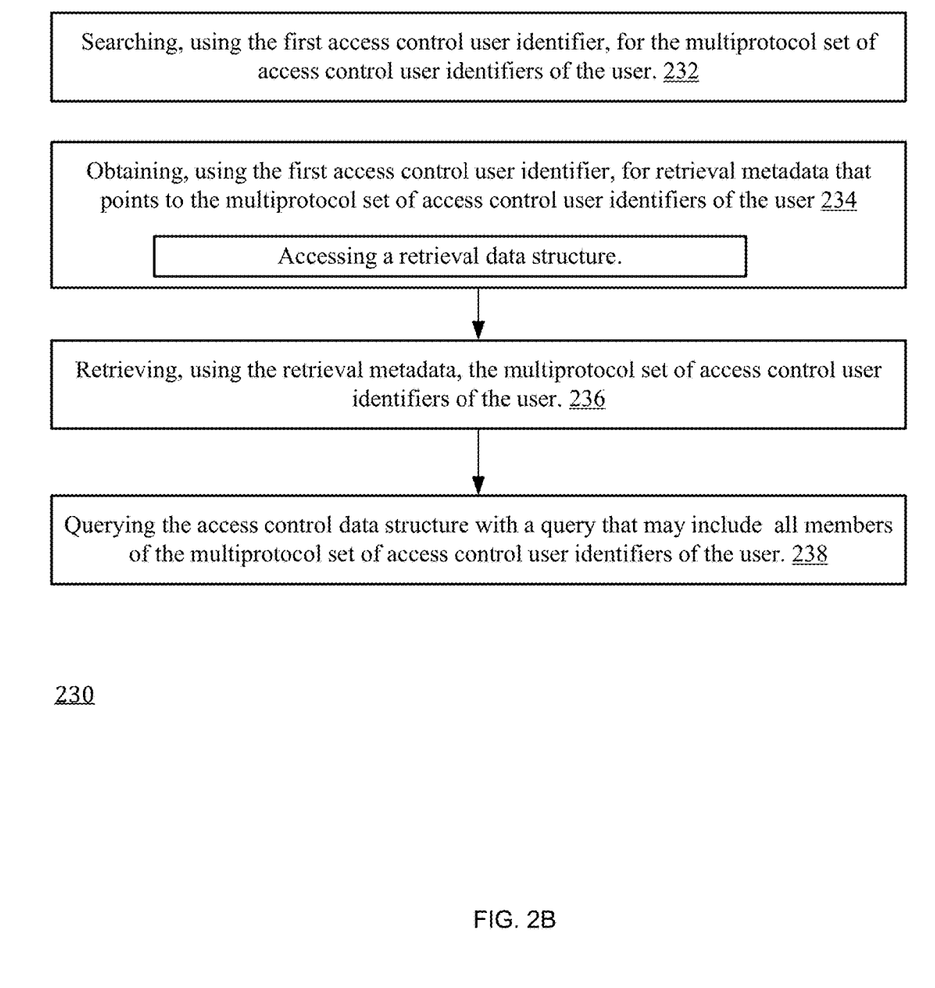
FIG. 2B illustrates an example of a method.

Step 230 may include at least one of steps 232, 234, 236 and 238. These steps are illustrated in FIG. 2B.

Step 232 may include searching, using the first access control user identifier, for the multiprotocol set of access control user identifiers of the user.

Step 234 may include obtaining, using the first access control user identifier, a retrieval metadata that points to the multiprotocol set of access control user identifiers of the user. The obtaining may include accessing a retrieval data structure. Pointers 601(1)-601(N) of FIG. 1 are an example of retrieval metadata arranged in retrieval data structure 101.

Step 234 may be followed by step 236 of retrieving, using the retrieval metadata, the multiprotocol set of access control user identifiers of the user.

Step 232 or step 236 may be followed by step 238 of querying the access control data structure with a query that may include all members of the multiprotocol set of access control user identifiers of the user.

For example—referring to FIG. 1—a query related to User1 will include searching for any one of IID=1 and IID=2 within the access control data structure 660. Yet for another example—a query related to User2 will include searching for any one of IID=3. IID=4 and IID=5 within the access control data structure 660.

Method 200 may also include step 260 of updating, following updates in one or more user identifiers of the user, one or more data structures related to the user without updating the access control data structure. The updating can be done regardless of any of the previously mentioned steps of method 200.

Figure 3A:
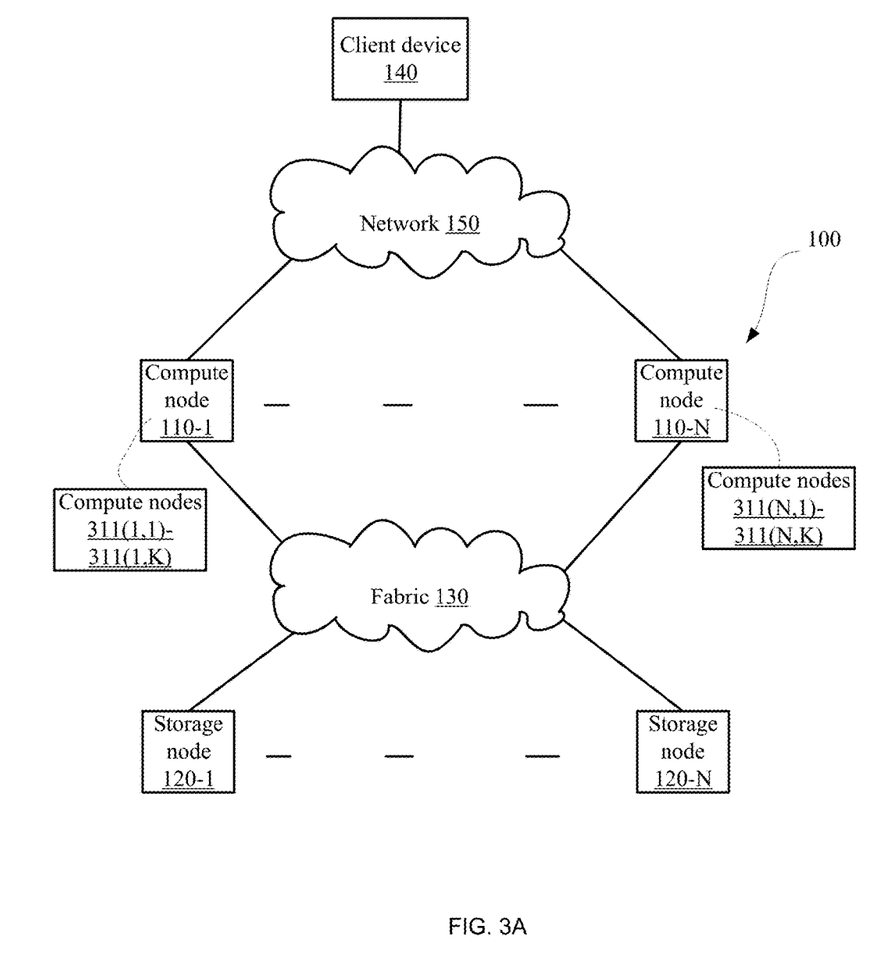
FIG. 3A is an example of a storage system.

FIG. 3A shows an example diagram of a storage system 100 that implements the filesystem server, according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N. The storage nodes may store filesystems that include filesystem entities, as well as respective access control data structures.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with multiple clients, such as a client device 140, which may access the compute node as a client of any filesystem protocol, via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.), as well as file protocols (e.g., SMB, NFS) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

Storage system 100 and particularly compute nodes 110 implement a multi file protocol environment for supporting the server side of both case insensitive file system and case sensitive file system.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 3C and 3D, each storage node 120 further includes a non-volatile random-access memory (NVRAM) and an interface module for interfacing with the compute nodes 110.

The storage nodes store the filesystems' data and metadata. At least part of the filesystem metadata may be stored in the NVRAM, for example, the upper layers of the data structures illustrated in FIGS. 3A and 3B may be stored in the NVRAM, while the lower layers of the filesystem metadata, such as the name blocks 240, may be stored in the SSDs.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

Figure 3B:
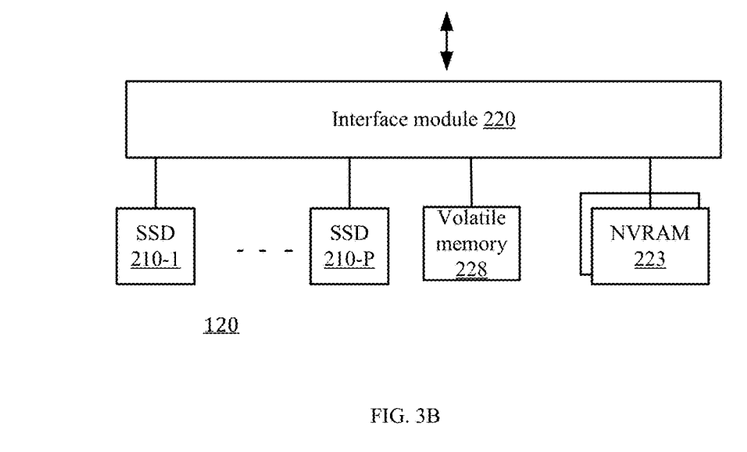
FIG. 3B is an example of a storage node.

FIG. 3B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may be kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 3C:
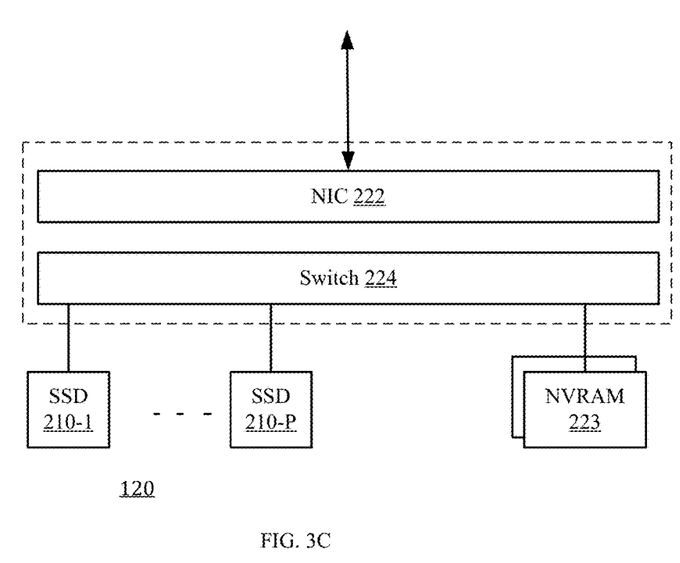
FIG. 3C is an example of an interface module of a storage node.

FIG. 3C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 3A) over the communication fabric (130, FIG. 3A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch. In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 3D:
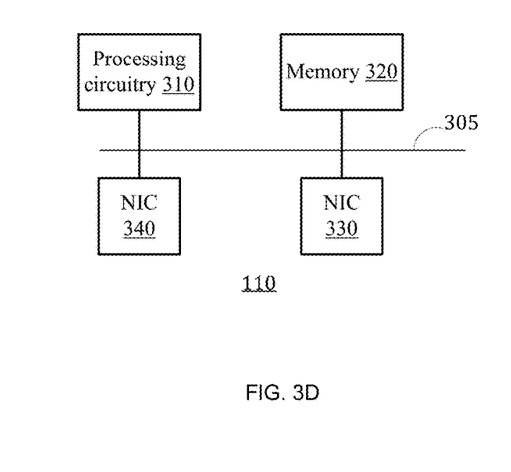
FIG. 3D is an example of a compute node.

FIG. 3D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 3A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 3A) through a communication network (e.g., the network 150, FIG. 3A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for access control, the method comprises:
receiving, by a file server, an access request for allowing a user to access a file system entity, wherein the user is identified by a first file system protocol (FSP) user identifier that is compliant with the first FSP;
converting the first FSP user identifier to a first access control user identifier of the user, the first access control user identifier of the user represents a combination of the user and the first FSP, within the file server; wherein a size of the first FSP user identifier exceeds a size of the first access control user identifier of the user, and wherein the first access control user identifier is not compliant with the first FSP;
obtaining a multiprotocol set of access control user identifiers, based on the first access control user identifier of the user;
searching, within an access control data structure, based on the multiprotocol set of access control user identifiers, for a relevant access control rule, the relevant access control rule is associated with a member of multiple members of the multiprotocol set of access control user identifiers of the user, wherein the multiple members of the multiprotocol set of access control user identifiers of the user comprises the first access control user identifier of the user and at least one other access control user identifier of the user that represents at least one combination of the user and at least one other FSP, wherein none of the multiple members is compliant with any FSP represented by the multiple members; and responding to the access request based on the relevant access control rule, when finding the relevant access control rule.

2. The method according to claim 1 comprising granting the access request, when finding the relevant access control rule, wherein the granting is made according to the relevant access control rule, wherein the granting is made even when the member of the multiprotocol set of access control user identifiers differs from the first access control user identifier.

3. The method according to claim 1 comprising granting the access request, when finding the relevant access control rule, wherein the granting is made according to the relevant access control rule, wherein the granting is made even when the first access control identifier is not included in the access control data structure.

4. The method according to claim 1 comprising denying the access request when failing to find the multiprotocol set of access control user identifiers of the user.

5. The method according to claim 1 comprising searching, using the first access control user identifier, for the multiprotocol set of access control user identifiers of the user.

6. The method according to claim 5 wherein the converting of the first FSP user identifier to the first access control user identifier comprises accessing a first conversion data structure.

7. The method according to claim 5 wherein the searching comprises obtaining, by using the first access control user identifier, retrieval metadata that points to the multiprotocol set of access control user identifiers of the user.

8. The method according to claim 7 wherein the obtaining comprises accessing a retrieval data structure.

9. The method according to claim 7 comprising retrieving, using the retrieval metadata, the multiprotocol set of access control user identifiers of the user.

10. The method according to claim 5 comprising querying the access control data structure with a query that comprises all members of the multiprotocol set of access control user identifiers of the user.

11. The method according to claim 1 comprising denying the access request when failing to find the multiprotocol set of access control user identifiers of the user.

12. The method according to claim 1 wherein the access control data structure stores a mapping between one member of the multiprotocol set of access control user identifiers of the user and an access control rule applicable to the user.

13. The method according to claim 1 wherein the member of the multiprotocol set of access control user identifiers of the user represents a combination of the user and an initial FSP which is an FSP in which a file system entity associated with the set was created.

14. The method according to claim 1 comprising updating, following updates in one or more user identifiers of the user, one or more data structures related to the user without updating the access control data structure.

15. The method according to claim 1 wherein the size of the first FSP user identifier exceeds the size of the first access control user identifier of the user by a factor of at least ten.

16. A non-transitory computer readable medium for striping, the non-transitory computer readable medium stores instructions for:

receiving, by a file server, an access request for allowing a user to access a file system entity, wherein the user is identified by a first file system protocol (FSP) user identifier that is compliant with the first FSP;

converting the first FSP user identifier to a first access control user identifier of the user, the first access control user identifier of the user represents a combination of the user and the first FSP, within the file server; wherein a size of the first FSP user identifier exceeds a size of the first access control user identifier of the user, and wherein the first access control user identifier is not compliant with the first FSP;

obtaining a multiprotocol set of access control user identifiers, based on the first access control user identifier of the user;

searching, within an access control data structure, based on the multiprotocol set of access control user identifiers, for a relevant access control rule, the relevant access control rule is associated with a member of multiple members of the multiprotocol set of access control user identifiers of the user, wherein the multiple members of the multiprotocol set of access control user identifiers of the user comprises the first access control user identifier of the user and at least one other access control user identifier of the user that represents at least one combination of the user and at least one other FSP, wherein none of the multiple members is compliant with any FSP represented by the multiple members; and responding to the access request based on the relevant access control rule, when finding the relevant access control rule.

17. A file server that comprises a processor and a memory; wherein the memory is configured to store an access control data structure; and wherein the processor is configured to:

(a) receive an access request for allowing a user to access a file system entity, wherein the user is identified by a first file system protocol (FSP) user identifier that is compliant with the first FSP, and obtain a multiprotocol set of access control user identifiers, based on the first access control user identifier of the user;

(b) convert the first FSP user identifier to a first access control user identifier of the user, the first access control user identifier of the user represents a combination of the user and the first FSP, within the file server; wherein a size of the first FSP user identifier exceeds a size of the first access control user identifier of the user, and wherein the first access control user identifier is not compliant with the first FSP;

(c) search, within the access control data structure, based on the multiprotocol set of access control user identifiers, for a relevant access control rule, the relevant access control rule is associated with a member of multiple members of the multiprotocol set of access control user identifiers of the user, wherein the multiple members of the multiprotocol set of access control user identifiers of the user comprises the first access control user identifier of the user and at least one other access control user identifier of the user that represents at least one combination of the user and at least one other FSP, wherein none of the multiple members is compliant with any FSP represented by the multiple members; and (d) respond to the access request based on the relevant access control rule, when finding the relevant access control rule.

* * * * *